United States Patent [19]
Morisawa et al.

[11] 4,058,193
[45] Nov. 15, 1977

[54] HYDRAULIC CONTROL DEVICE FOR USE IN AN AUTOMATIC TRANSMISSION

[75] Inventors: Kunio Morisawa; Isamu Minemoto; Tatsuo Kyushima, all of Toyota, Japan

[73] Assignee: Toyota Jidosha Kogyo Kabushiki Kaisha, Toyota, Japan

[21] Appl. No.: 641,901

[22] Filed: Dec. 18, 1975

[30] Foreign Application Priority Data

Apr. 16, 1975 Japan .................. 50-45160

[51] Int. Cl.² ............................ F16D 25/10
[52] U.S. Cl. ............... 192/109 F; 192/87.13
[58] Field of Search ........... 192/109 F, 85 R, 87.13

[56] References Cited
U.S. PATENT DOCUMENTS 3,158,037  11/1964  Searles .................... 74/864
3,572,177  3/1971   Ishihara ................ 192/109 F
3,618,424  11/1971  Golan et al. .......... 192/109 F Primary Examiner—Benjamin W. Wyche
Attorney, Agent, or Firm—Finnegan, Henderson, Farabow & Garrett

[57] ABSTRACT

A hydraulic control device for use in an automatic transmission includes an accumulator which moderates the increased fluid pressure supplied to a hydraulically actuated frictional engagement device when a gear shift is made to a forward drive condition. The hydraulic control device has an orifice and a check valve disposed in parallel to each other in a passage supplying the fluid pressure to the frictional engagement device so that the check valve is closed and the orifice reduces the increased fluid pressure supplied to the frictional engagement device as the frictional engagement device is actuated.

5 Claims, 3 Drawing Figures

HYDRAULIC CONTROL DEVICE FOR USE IN AN AUTOMATIC TRANSMISSION

BACKGROUND OF THE INVENTION

This invention relates to a hydraulic control device for use in an automatic transmission. More particularly, this invention relates to a hydraulic control device for use in an automatic transmission which reduces shock during a gear shift into a forward drive condition such as drive (D), second (2nd), or low (L).

As well known in the art, automatic transmissions include types having a torque converter and a planetary gear unit with a clutch located therebetween. The clutch is similar to a clutch element of a manual transmission which lies between an engine and a gear train. When the gear transmission is shifted to a D, 2nd, or L position, the clutch is hydraulically actuated so as to be brought into engagement. Consequently, power is transmitted from the torque converter through the planetary gear unit by engagement of the clutch to an output shaft, and a forward drive condition is established. During this operation, a working fluid pressure is directly supplied to a piston chamber of the clutch without being hydraulically controlled, and the clutch is engaged in a quick and sudden response. This sudden power transmission causes an unsatisfactory heavy shock.

Accordingly, it is a primary object of this invention to provide a new and improved hydraulic control device which can be used in automatic transmissions to eliminate the above-described problems.

Another object of this invention is to provide a new and improved hydraulic control device for use in automatic transmissions of the type having a frictional engagement device between a torque converter and a planetary gear unit to smoothly bring the device into engagement when actuated.

Still another object of this invention is to provide a new and improved hydraulic control device for use in an automatic transmission that smoothly brings a frictional engagement device into engagement when actuated by modulating the fluid pressure supplied to it.

It is a further object of this invention to provide a new and improved hydraulic control device for modulating fluid pressure to a frictional engagement device that is reliable and conserves on space.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the hydraulic control device of this invention is for automatic transmissions of the type having an input shaft, an intermediate shaft coupled to the input shaft through a hydraulically actuated frictional engagement device during a forward drive condition, servo means for hydraulically actuating the frictional engagement device, an output shaft operatively connected to the intermediate shaft through a planetary gear mechanism, a hydraulic fluid pressure source, a manual shift position selector mechanism for establishing a forward drive condition, and channel means for supplying fluid pressure from the fluid pressure source to the servo means when a forward driven condition is established by the shift position selector mechanism, and comprises means for modulating the increased fluid pressure supplied by the channel means to the servo means upon actuation of the frictional engagement device for minimizing shock as the intermediate shaft is coupled to the input shaft during shift into a forward drive condition.

Preferably, the modulating means includes accumulator means connected with the channel means for moderating the increased fluid pressure supplied to the servo means by the channel means when the frictional engagement device is to be actuated, and wherein a fixed member is located adjacent to the output shaft for mounting the accumulator means.

It is also preferred that the modulating means further includes an orifice and a check valve disposed in parallel to each other in the channel means, the check valve being closed and the orifice reducing the increased fluid pressure supplied to the servo means by the channel means when the frictional engagement device is to be actuated.

The invention consists in the novel parts, constructions, arrangements, combinations and improvements shown and described. The accompanying drawings, which are incorporated in and constitute a part of this specification, illustrate one embodiment of the invention and, together with the description, serve to explain the principles of the invention.

DETAILED DESCRIPTION OF THE DRAWINGS

Reference will now be made in detail to the present preferred embodiment of the invention, an example of which is illustrated in the accompanying drawings.

Figure 1:
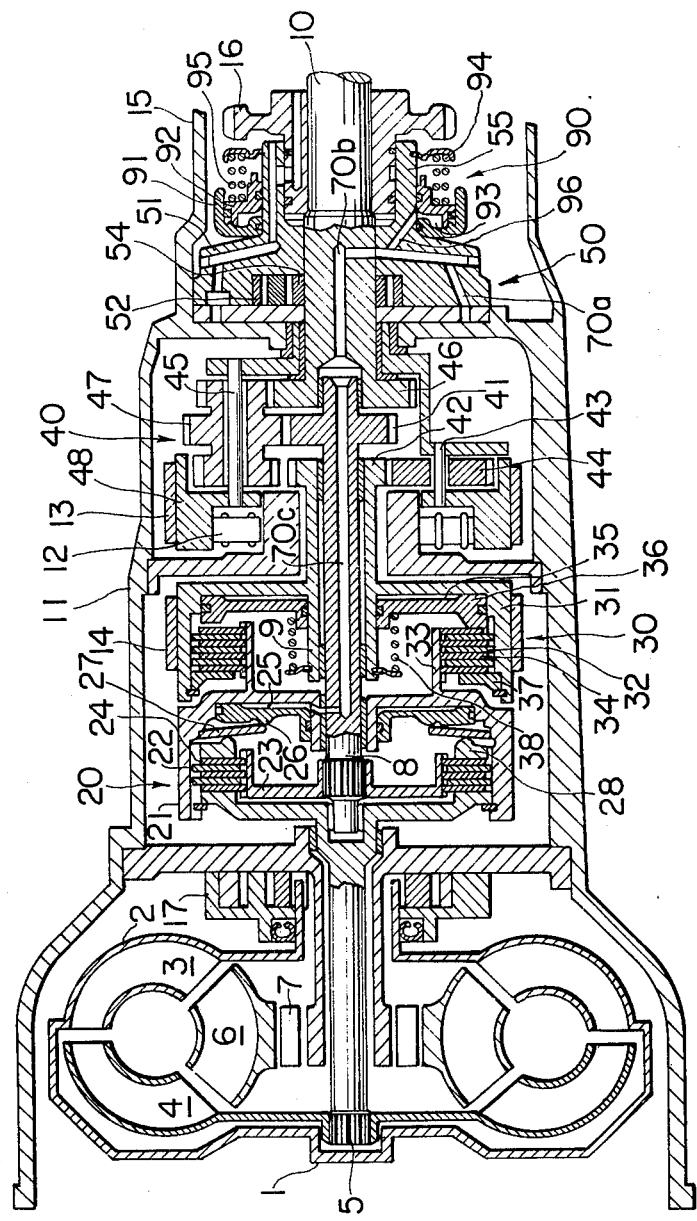
FIG. 1 is a vertical sectional view of an automatic transmission employing the teachings of this invention.

Referring to FIG. 1, an automatic transmission, as well known in the art, is shown having a connecting member 1 integral with an engine output shaft coupled to a pump impeller 3 of a torque converter 2. A stator 6 of torque converter 2 is supported so as to be rotated in only one direction by a one-way clutch 7. A front oil pump 17 is drivably disposed on pump impeller 3. A turbine runner 4 of torque converter 2 is coupled with a transmission input shaft 5. Input shaft 5 is coupled to a first intermediate shaft 8 through a frictional engagement device such as front clutch 20 and to a second intermediate shaft 9 through a frictional engagement device such as rear clutch 30. Intermediate shafts 8 and 9 are operatively connected to a transmission output shaft 10 through a planetary gear mechanism 40.

Front clutch 20 is so constructed that plates 22 are arranged on a drum 21 integrally coupled with input shaft 5, while discs 24 are arranged alternately with plates 22 on a hub 23 integrally coupled with intermediate shaft 8. Servo means such as hydraulically actuated piston 26 located in drum 21 defines a fluid pressure chamber 25. When piston 26 is actuated by fluid pressure in chamber 25, piston 26 brings plates 22 and discs 24 into engagement through a diaphragm spring 27 as well as a keep plate 28 so as to transmit power of input shaft 5 to intermediate shaft 8.

Rear clutch 30 is so constructed that plates 32 are arranged on a drum 31 integrally coupled with intermediate shaft 9, while discs 34 are arranged alternately with plates 32 on a hub 33 formed as a part of drum 21 of front clutch 20. A hydraulically actuated piston 36 located in drum 31 defines a fluid pressure chamber 35. When piston 36 is actuated by fluid pressure in chamber 35, piston 36 is moved against a return spring 38 to bring plates 32 and discs 34 into engagement between piston 36 and a flange 37. The power of input shaft 5 is thus transmitted to intermediate shaft 9.

The planetary gear mechanism 40 includes sun gears 41 and 42 which are formed on intermediate shafts 8 and 9, respectively. A pinion 44, which is rotatably supported by a pin 43, meshes with sun gear 42. A pinion 47, which is rotatably supported by a pin 45, meshes with sun gear 41, pinion 44 and a gear 46 formed on output shaft 10. A carrier 48 holds pin 45 and pinion 47. A one-way clutch 12 is provided between carrier 48 and a transmission case 11. A rear brake band 13 which effects a braking action through a servomechanism not shown is disposed on carrier 48. A front brake band 14 which similarly effects a braking action is disposed on rear clutch drum 31 integral with sun gear 42.

An extension housing 15 from transmission case 11 is provided rearwardly from planetary gear mechanism 40. Inside extension housing 15, there is provided a rear oil pump 50 having a body 51 integrally mounted on transmission case 11, a driven gear 52, and a drive gear 54 integrally mounted on output shaft 10. On the rear side of the rear oil pump 50, a gear 16 is provided for locking output shaft 10 during a parking condition by being snugly fitted in a boss portion 55 of pump body 51.

During operation of the automatic transmission, an engagement of front clutch 20 directly couples input shaft 5 to intermediate shaft 8, so that the power from torque converter 2 is transmitted to sun gear 41 of planetary gear mechanism 40. The rotation of carrier 48 is restrained under the action of one-way clutch 12 or rear brake band 13 so as to cause pinion 44 to rotate by itself. Therefore, output shaft 10 assumes a low speed rotation of the greatest gear ratio and the first speed running condition is established. When the rotation of sun gear 42 is restrained under the action of front brake band 14, carrier 48 is rotated so that output shaft 10 is shifted from the first speed to the second speed running condition. Further, when rear clutch 30 is also brought into engagement, input shaft 5 is directly coupled to intermediate shaft 9 so that the power from torque converter 2 is transmitted also to sun gear 42. In this event, planetary gear mechanism 40 becomes integral and the power is applied directly to output shaft 10 to establish the third speed running condition. When the rotation of carrier 48 is restrained by rear brake band 13 as the power of torque converter 2 is being transmitted to sun gear 42 by rear clutch 30, the rotation of output shaft 10 is reversed by pinion 44 to establish the reverse speed running condition.

Figure 2:
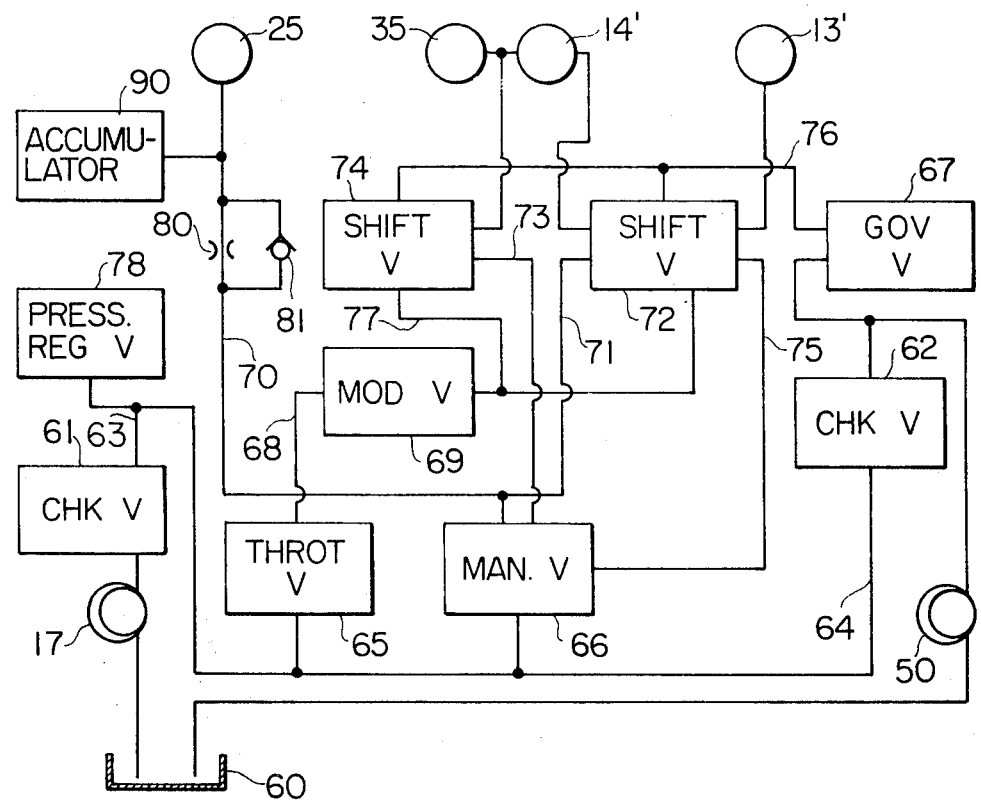
FIG. 2 is a circuit diagram which shows a hydraulic control device embodying the teachings of this invention.

Referring now to FIG. 2, a diagram is shown of a hydraulic control device employing the teachings of this invention which actuates clutches 20 and 30 and brake bands 13 and 14. Fluid from a hydraulic fluid pressure source, including a fluid reservoir 60 and pumps 17 and 50, is supplied to a pressure regulator valve 78 by channel means 63 and 64 respectively having check valves 61 and 62, so as to generate a predetermined working fluid pressure in the system. A throttle valve 65 is provided in channel means 64 to generate a throttle pressure corresponding to the opening of a carburetor throttle valve. Also in channel means 64 there is a manual valve 66 of a manual shift position selector mechanism which changes over passages in accordance with a parking (P), reverse (R), neutral (N), drive (D), second (2nd), or low (L) gear shift position, and a governor valve 67 which generates a governor pressure in relationship to the vehicular running speed. A fluid channel means 68 connects throttle valve 65 to a modulator valve 69 which reduces and controls the throttle pressure and generates a throttle modulator pressure. A fluid channel means 70 connects the exit side of manual valve 66 to pressure chamber 25 of front clutch 20. A fluid channel means 71 branched from fluid channel means 70 is connected through a first-second shift valve 72 onto the "apply" side of a servomechanism 14' which actuates front brake band 14. A fluid channel means 73 from manual valve 66 is connected through a second-third shift valve 74 with pressure chamber 35 of rear clutch 30 and the "release" side of servomechanism 14'. A fluid channel means 75 from manual valve 66 is connected through first-second shift valve 72 to a servomechanism 13' which actuates rear brake band 13. Further, a fluid channel means 76 from governor valve 67 and fluid channel means 77 from modulator valve 69 are both connected with shift valves 72 and 74 so that the governor pressure and the modulator pressure may act in opposition to each other.

When a gear shift is made to the N position, manual valve 66 prevents fluid pressure in channel means 64 from entering fluid channel means 70, 71, 73, and 75 in the hydraulic control device. Therefore, the automatic transmission falls into the neutral running condition. When a gear shift is made to the D position, manual valve 66 allows fluid pressure in fluid channel means 64 to enter fluid channel means 70, 71, and 73. Front clutch 20 is therefore brought into engagement by fluid pressure being supplied to pressure chamber 25, and a forward drive condition is established. At this time, the governor pressure from governor valve 67 and the throttle modulator pressure from modulator valve 69 act oppositely on both shift valves 72 and 74. When both the vehicular speed and the governor pressure are low, fluid channel means 71 and 73 are closed by shift valves 72 and 74, and both the piston chamber 35 and servomechanism 14' have fluid pressures exhausted. Consequently, the first speed running condition is established by one-way clutch or brake 12. When first-second shift valve 72 is actuated by the governor pressure attendant upon an increase of the vehicular speed, fluid channel means 71 is opened to supply fluid pressure to the "apply" side of servomechanism 14'. Consequently, front brake band 14 functions to shift the transmission to the second speed running condition. When the vehicular speed increases more, second-third shift valve 74 also is actuated so that fluid channel means 73 is opened to supply fluid pressure to pressure chamber 35 and the "release" side of servomechanism 14'. Consequently, rear clutch 30 functions while front brake band 14 is released to shift the transmission to the third speed running condition. Conversely, where the vehicular speed progressively decreases from a high speed, a downshift to a lower speed running condition is made.

Even in the identical forward speed change region, the operation differs in dependence on the gear shift position. When a gear shift is made to the L position, fluid is supplied to fluid pressure chamber 25 and servomechanism 13′, so that the first speed state is established with the engine brake working under the actions of front clutch 20 and rear brake band 13. When a gear shift is made to the 2nd position, only the speed change between the first speed and the second speed is performed.

In accordance with the invention, the hydraulic control device is provided with means for modulating the increased flow of fluid pressure supplied by channel means to servo means for actuating the frictional engagement device which establishes a forward drive condition in response to the shift position selector mechanism. Preferably, and as best shown in FIG. 2, modulating means includes accumulator means 90 connected with fluid channel means 70 which extends from manual valve 66 of the shift position selector mechanism to pressure chamber 25 of front clutch 20. It is also preferred that modulating means further includes an orifice 80 and check valve 81 disposed in parallel to each other in channel means 70.

As here embodied, and as best seen in FIG. 1, channel means 70 comprises a passage 70a which is formed in body 51 of rear fluid pump 50 toward the transmission side, a passage 70b which is formed in output shaft 10 in a manner to be connected with passage 70a, and a passage 70c which is formed in intermediate shaft 8 in a manner to connect passage 70b and pressure chamber 25 of front clutch 20. The fluid pressure from manual valve 66 is supplied through passages 70a, 70b, and 70c to pressure chamber 25.

In accordance with the invention, accumulator means 90 is mounted on body 51 of rear fluid pump 50 in such manner that it can moderate the fluid pressure in channel means 70. Preferably, accumulator means 90 includes an annular cylinder 91 fixed to boss portion 55 of rear fluid pump body 51. Between cylinder 91 and boss portion 55, a piston 92 is slidably fitted and defines a pressure chamber 93 for receiving fluid pressure. Piston 92 is adapted to vary the volume of chamber 93. A return spring 95 is interposed between piston 92 and a spring shoe 94 located on the opposite side to pressure chamber 93 to act against piston 92. A passage 96 is formed in boss portion 55 so as to connect passage 70a of channel means 70 and pressure chamber 93 of accumulator means 90.

The hydraulic control device employing the teachings of this invention operates in the following manner. During a gear shift position of P, R, or N, pressure chamber 25 of front clutch 20 has fluid pressure exhausted or is relieved. Consequently, front clutch 20 is not actuated or engaged. When a gear shift is made to the D, 2nd, or L position, fluid pressure from manual valve 66 is supplied to pressure chamber 25 through fluid channel means 70 composed of passages 70a, 70b, and 70c. At this time, check valve 81 is closed. Orifice 80 operates to compress the fluid whereupon it is also fed to pressure chamber 93 of accumulator means 90 through passage 96. The pressure chamber 25 having been empty until this time is now filled with fluid, and its fluid pressure begins to abruptly rise. When the fluid pressure reaches a predetermined value, piston 92 in accumulator means 90 begins to move overcoming the force of spring 95.

Figure 3:
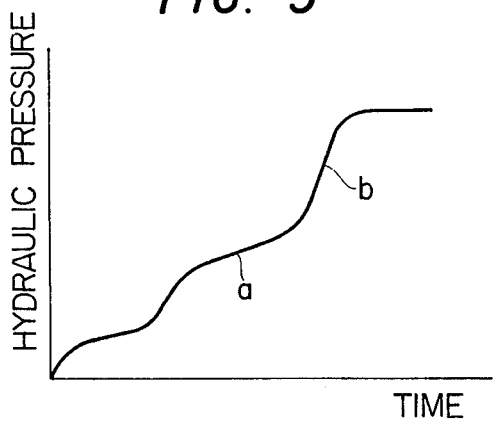
FIG. 3 is a graph showing hydraulic pressure characteristics during operation of a hydraulic control device employing the teachings of this invention.

As piston 92 of accumulator means 90 balances with the force of spring 95, fluid pressure in channel means 70 rises smoothly as characterized by a part *a* of the hydraulic pressure curve shown in FIG. 3. Accordingly, plates 22 and discs 24 of front clutch 20 slowly engage in response to piston 26 which is actuated by fluid pressure supplied to pressure chamber 25 by channel means 70. Input shaft 5 is therefore coupled to intermediate shaft 8 and power is transmitted quietly with a light or minimum amount of shock. When the fluid pressure in the pressure chamber 25 reaches a fluid pressure where front clutch 20 is substantially brought into engagement, piston 92 of accumulator means 90 abuts on spring shoe 94 and the action of accumulator means 90 terminates. Thereafter, the fluid pressure in pressure chamber 25 rises abruptly as characterized by a part *b* of the hydraulic pressure curve shown in FIG. 3, and finally becomes the line pressure.

In a situation where a gear shift is made from the D, 2nd, or L position to the P, R, or N position, fluid pressure in pressure chamber 25 of front clutch 20 is relieved. Since manual valve 66 is on the lower pressure side, check valve 81 is opened. Pressure chamber 25 of front clutch 20 and pressure chamber 93 of accumulator means 90 have their fluid pressures exhausted in short periods of time. Consequently, immediately after the gear shift, front clutch 20 is released, and piston 92 of accumulator means 90 returns to its original position.

As can be seen from the foregoing, the increased fluid pressure supplied to front clutch 20 is modulated and the transmission of power from input shaft 5 to intermediate shaft 8 is quietly effected during a gear shift to the D, 2nd, or L position. Therefore, the shock, as input shaft 5 is coupled to intermediate shaft 8, can be remarkably reduced. Additionally, in the preferred embodiment, accumulator means 90 is mounted on body 51 of rear oil pump 50 on the transmission side close to passages 70a, 70b, and 70c of channel means 70 which supplies fluid pressure to pressure chamber 25 of front clutch 20. For this reason, the invention provides a reliable modulating action and a hydraulic control device which conserves space. It should be further noted, however, that the mounting of accumulator means 90 need not be limited to rear oil pump body 51.

As can be seen, the invention could be employed in an automatic transmission or hydraulic control device other than the one described in this preferred embodiment. It will be apparent to those skilled in the art that various modifications and variations could be made in the hydraulic control device of the invention without departing from the scope or spirit of the invention.

What is claimed is:

1. In hydraulic control device for automatic transmissions of the type having an output shaft, an intermediate shaft coupled to the input shaft through a hydraulically actuated frictional engagement device during a forward drive condition, servo means for hydraulically actuating the frictional engagement device, an output shaft operatively connected to the intermediate shaft through a planetary gear mechanism, a hydraulic fluid pressure source including a fluid reservoir and a pump connected to said fluid reservoir for generating a hydraulic fluid pressure, a manual shift position selector mechanism for establishing a forward driven condition, and channel means for supplying fluid pressure from the pump to the servo means when a forward drive condition is established by the shift position selector mechanism, means for modulating the increased fluid pressure supplied by said channel means to said servo means upon actuation of said frictional engagement device for minimizing shock as said intermediate shaft is coupled to said input shaft during shift into a forward drive condition comprising a first passage formed in said intermediate shaft and connected to said servo means, a second passage formed in said output shaft and connected to said first passage, and a third passage connecting said second passage to said pump and said fluid reservoir forming the channel means, and accumulator means fixedly positioned co-axially around said output shaft and fluidly connected to said third passage for providing a fast modulation of the pressure of the fluid supplied by said channel means and for minimizing the size of said hydraulic device.

2. The hydraulic control device as recited in claim 1 wherein said modulating means further includes an orifice and a check valve disposed in parallel to each other in said channel means, said check valve being closed and said orifice reducing the increased fluid pressure supplied to said servo means by said channel means when said frictional engagement device is to be actuated.

3. A hydraulic control device for automatic transmissions of the type having an output shaft, an intermediate shaft coupled to the input shaft through a hydraulically actuated frictional engagement device during a forward drive condition, servo means for hydraulically actuating the frictional engagement device, an output shaft operatively connected to the intermediate shaft through a planetary gear mechanism, a hydraulic fluid pressure source including a fluid reservoir and a pump with a body housing, the pump being connected to said fluid reservoir for generating a hydraulic fluid pressure, a manual shift position selector mechanism for establishing a forward drive condition, and channel means for supplying fluid pressure from the pump to the servo means when a forward drive condition is established by the shift position selector mechanism, wherein said channel means includes a first passage formed in said intermediate shaft and connected to said servo means, a second passage formed in said output shaft and connected to said first passage, and a third passage formed in said body housing of said pump connecting said second passage to said pump and said fluid reservoir, and wherein said device includes means for modulating the increased fluid pressure supplied by said channel means to said servo means upon actuation of said frictional engagement device for minimizing shock as said intermediate shaft is coupled to said input shaft during shift into a forward drive condition, said modulating means including accumulator means connected to said channel means and wherein said device also includes a fixed member, including said pump body housing, positioned co-axially around said output shaft for mounting said accumulator means adjacent said third passage.

4. The hydraulic control device as recited in claim 3 wherein said pump has a boss portion and said accumulator means includes a cylinder fixed to said boss portion, a piston received between said cylinder and said boss portion to define a pressure chamber for receiving fluid pressure, said piston being capable of varying the volume of said pressure chamber and being actuated by the increased fluid pressure in said channel means to said servo means, and a passage formed in said boss portion for connecting said pressure chamber to said third passage.

5. The hydraulic control device as recited in claim 3 wherein said frictional engagement device includes a clutch having a hub attached to said intermediate shaft, discs mounted on said hub, a drum attached to said input shaft, and drive plates mounted on said drum for engagement with said discs; and said servo means includes a hydraulically actuated piston located within said drum for bringing said plates and discs into engagement, said piston and said drum defining a pressure chamber for receiving fluid pressure and wherein said first passage is connected to said pressure chamber defined by said piston and said drum for introducing fluid pressure.

* * * * *